(No Model.)
W. SMITH.
COTTON CHOPPER.
No. 483,794. Patented Oct. 4, 1892.
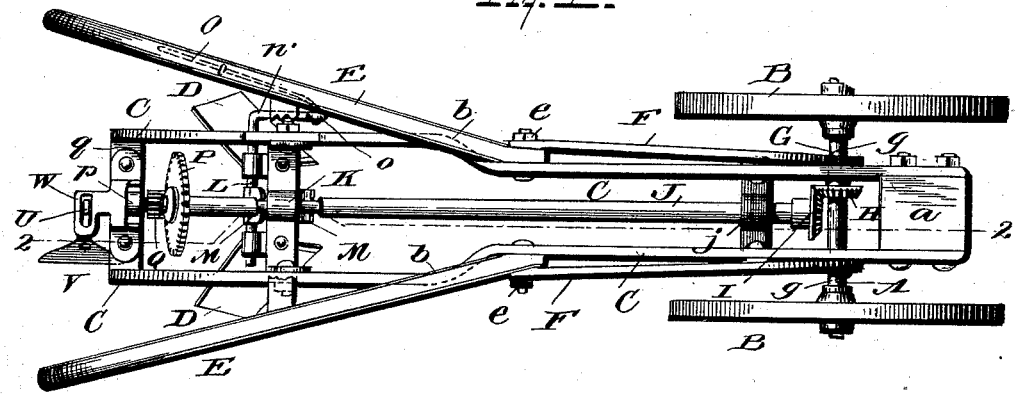
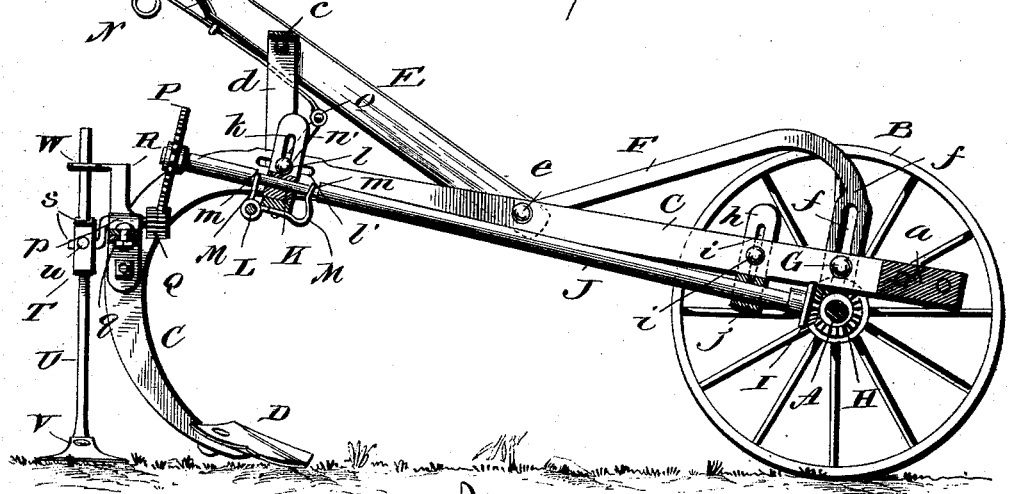
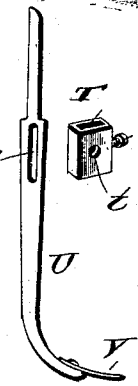
Witnesses
L. C. Hills.
E. H. Bond.
Inventor
William Smith.
per Chas. N. Fowler
Attorney

UNITED STATES PATENT OFFICE.

WILLIAM SMITH, OF BASTROP, LOUISIANA, ASSIGNOR OF ONE-HALF TO JOSEPH B. LEVY, OF SAME PLACE.

COTTON-CHOPPER.

SPECIFICATION forming part of Letters Patent No. 483,794, dated October 4, 1892.

Application filed May 18, 1892. Serial No. 433,457. (No model.)

*To all whom it may concern:*

Be it known that I, WILLIAM SMITH, a citizen of the United States, residing at Bastrop, in the parish of Morehouse and State of Louisiana, have invented certain new and useful Improvements in Cotton-Choppers; and I do hereby declare that the following is a full, clear, and exact description of the same, reference being had to the annexed drawings, making a part of this specification, and to the letters of reference marked thereon.

This invention relates to certain new and useful improvements in that class of agricultural implements known as "cotton-choppers;" and it has for its objects, among others, to provide an improved device of this character which shall be simple and cheap of construction and durable and efficient in operation.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a top plan of my improvement. Fig. 2 is a vertical longitudinal section on the line 2 2 of Fig. 1. Fig. 3 is a perspective view of the hoe and its adjustable sleeve detached.

Like letters of reference indicate like parts throughout the several views.

Referring now to the details of the drawings by letter, A designates the axle, carrying the wheels B, of known construction.

C are the side bars which constitute the frame, the front ends of which are connected by the block $a$, to which the draft appliances may be attached in any suitable manner. The rear ends of these side bars are curved downward and forward, as seen best in Fig. 2, and have secured thereto the scrapers D, which may be of any preferred form of construction and secured thereto in any suitable manner.

E are the handles, which are secured at their forward ends to the bars C in any suitable manner, the side bars being provided with inward bends or offsets $b$ near the points of connection of the handles, as seen in Fig. 1, and the handles resting upon the said bends. The rear portions of the handles are supported and connected by the cross-bar $c$, which is supported from the side bars, as by the uprights $d$, which may be integral with the said cross-bar.

F are curved bars, the rear ends of which are pivoted on the pins or other means $e$, which connect the handles to the side bars, and their forward ends are curved to form the substantially-vertical arms $f$, the lower ends of which are formed to support the axle and which above the axle are slotted, as seen at $f'$ in Fig. 2, and in these slots work the bolts G, which are held in the side bars C and are provided with nuts $g$, by the loosening of which the front end of the frame can be raised or lowered, as may be desired, to vary the inclination and depth of cut of the scrapers.

H is a bevel-pinion on the axle, designed to mesh with a bevel-pinion I on the central longitudinal shaft J. This shaft at its forward end is journaled in a box $j$, carried by the vertical arms $h$, which are slotted, as seen at $i$, and in which siots work the pins or bolts $i'$, by which the bearing may be adjusted vertically when necessary. The rear end of the shaft J is journaled in a box or bearing K, which is carried by the arms $k$, which are slotted longitudinally and in the slots of which work the bolts $l$, which also work in the longitudinal slots $l'$ of the side bars, as seen in Fig. 2, so that by loosening the nuts on these bolts the shaft may be adjusted in either direction, as may be desired.

In order to throw the shaft endwise to throw the bevel-pinions into or out of mesh, I provide a rock-shaft L on the under side of the bearing K, and this rock-shaft carries the bifurcated arms M, which engage shoulders $m$ on the shaft upon each side of the said bearing, as seen in Figs. 1 and 2, to move the shaft in either direction. One end of this rock-shaft has a crank-arm $n'$, to which is pivotally connected, as at $o$, one end of the rod O, which is movable in a suitable guide upon the under side of one of the handles and is provided with a loop or ring or finger-piece N, as seen in Fig. 2, by which it may be manipulated to throw the device into or out of gear when desired.

The rear end of the shaft J carries a gear-wheel P, which is designed to mesh with a small pinion Q on the inner or forward end of a short shaft R, which is journaled in a suitable box or bearing $p$ on the cross-bar $q$, which is suitably secured between the rear curved ends of the side bars, as seen in Figs. 1 and 2. The rear end of this short shaft is in the form of a crank or wrist pin $s$, which passes through a hole $t$ in the sleeve T, which is adjustably held on the shank U of the hoe V by a set-screw $u$, and which wrist or crank pin also passes through an elongated slot $v$ in the shank of the hoe, so that the sleeve may be adjusted to vary the depth of cut of the hoe without interfering with the successful movement of the shank. Rising from the cross-bar $q$ is a guide W, through which the upper end of the hoe-shank is loosely guided, as seen in Fig. 1.

The operation will be readily understood from the foregoing description, when taken in connection with the annexed drawings, and a detailed description thereof further than above given is not deemed necessary.

What I claim as new is—

1. The combination, with the hoe-shank having an elongated slot, of a sleeve on the shank and the wrist-pin engaging a hole in the sleeve and the slot in the shank, as set forth.

2. The combination, with the hoe-shank having an elongated slot, of a sleeve adjustably held on the shank and provided with a hole, the wrist-pin engaging the hole in the sleeve and the slot in the shank, and means for actuating the wrist-pin, as set forth.

3. The combination, with the frame and the central shaft carrying a pinion meshing with a pinion on the axle and provided with shoulders near its rear bearing, of a rock-shaft on said bearing, bifurcated arms carried by said rock-shaft and engaging said shoulders, and a rod pivoted to a crank-arm on said rock-shaft and arranged beneath one of the handles, as set forth.

4. The combination, with the side bars curved at their rear ends and carrying scrapers, of the handles, the curved arms having forward vertical slotted portions and bearings for the axle, means for adjusting the said vertical portions, the longitudinal shaft gearing with the axle, the hoe-shank, the crank-arm for operating the same, and the gearing between said crank-arm and the longitudinal shaft, substantially as specified.

In testimony that I claim the above I have hereunto subscribed my name in the presence of two witnesses.

WILLIAM SMITH.

Witnesses:
G. W. NAFF,
A. E. WASHBURN.